(12) United States Patent
Kim

(10) Patent No.: US 6,473,130 B1
(45) Date of Patent: Oct. 29, 2002

(54) METHOD AND APPARATUS FOR DISPLAYING SUB-PICTURES

(75) Inventor: Seung-Man Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,357

(22) Filed: Nov. 5, 1998

(30) Foreign Application Priority Data

Nov. 5, 1997 (KR) .......................................... 97-58135

(51) Int. Cl.$^7$ ................................................. H04N 5/45
(52) U.S. Cl. ...................................... 348/565; 348/564
(58) Field of Search ................................ 348/565–568, 348/564, 563; H04N 5/45

(56) References Cited

U.S. PATENT DOCUMENTS

| | | | |
|---|---|---|---|
| 4,278,993 A | * 7/1981 | Suzuki | ........................ 348/566 |
| 5,361,098 A | 11/1994 | Lucas | |
| 5,386,241 A | 1/1995 | Park | |
| 5,594,507 A | 1/1997 | Hoarty | |
| 5,614,952 A | 3/1997 | Boyce et al. | |
| 5,831,684 A | * 11/1998 | Morita et al. | ................ 348/513 |
| 6,075,567 A | * 6/2000 | Ohnishi | ........................ 348/153 |

* cited by examiner

*Primary Examiner*—Michael H. Lee
(74) *Attorney, Agent, or Firm*—Robert E. Bushnell, Esq.

(57) ABSTRACT

A picture display apparatus displays a sub-picture together with a main picture. The apparatus includes a detector for detecting a state of the main picture from an encoded main picture signal. A signal processor decodes the encoded main picture signal, signal-processes an input sub-picture signal and the decoded main picture signal, in order to display the main picture together with sub-picture, and output the processed picture signal. A controller controls the operation of the signal processor based upon the main picture state detected in the detector so that the sub-picture is discerned from the main picture. Thus, the sub-picture can be always distinctively discerned irrespective of the picture state of the main picture by varying the display state of the sub-picture according to the image complexity and the movement degree of the main picture.

18 Claims, 2 Drawing Sheets

METHOD AND APPARATUS FOR DISPLAYING SUB-PICTURES

CLAIM OF PRIORITY

This application makes reference to, incorporates the same herein, and claims all benefits s accruing under 35 U.S.C §119 from an application entitled Method And Apparatus For Displaying Sub-Pictures earlier filed in the Korean Industrial Property Office on Nov. 5, 1997, and there duly assigned Serial No. 97-58135 by that Office.

BACKGROUND OF THE INVENTION

1. Field of the Invention

The present invention relates to a method and apparatus for displaying a sub-picture together with a main picture. More particularly, the invention relates to a method and apparatus for varying the state of a sub-picture according to a complexity and a degree of movement of a main picture when a video signal compressed by a video compression standard, such as MPEG (Motion Picture Experts Group) standard, is reproduced as the main picture.

2. Description of the Related Art

In general, as reproduction apparatuses having a sub-picture display function, there are digital media reproduction apparatuses, such as a digital versatile disc (DVD) player, a video compact disc (CD) player, and a digital video signal reproduction apparatus utilizing the motion picture compression standard. Typically, a reproduction apparatus having a sub-picture display function displays a sub-picture on a main picture as shown in FIG. 3. Examples of reproduction apparatus having a sub-picture display function are provided by the following patents, incorporated by reference herein: U.S. Pat. No. 5,361,098 to Keith Lucas entitled Methods And Apparatus For Generating A Picture-In-Picture Digital Television Frame By Inserting A Mean-Only Frame Into A Full-Size Frame; U.S. Pat. No. 5,386,241 to Hak-Jae Park entitled Signal Transformation System And Method for Providing Picture-In-Picture In High Definition Television Receivers; U.S. Pat. No. 5,594,507 to W. Leo Hoarty entitled Compressed Digital Overlay Controller And Method For MPEG Type Video Signal; and U.S. Pat. No. 5,614,952 to Jill M. Boyce et al. entitled Digital Video Decoder for Decoding Digital High Definition And/Or digital Standard Definition Television Signals.

When the state of a main picture is complicated or the amount of movement thereof is large, an existing reproduction apparatus has a problem that a sub-picture is not definitely discerned from a main picture.

SUMMARY OF THE INVENTION

To solve the above problem, it is an object of the present invention to provide a method and apparatus for displaying a sub-picture in which the display state of the sub-picture is varied according to an image complexity and/or a degree of movement of a main picture, to thereby allow the sub-picture to be always distinct irrespective of the image state of the main picture.

To accomplish the above object of the present invention, there is provided a picture display method for displaying a sub-picture together with a main picture. The picture display method comprising the steps of (a) detecting a state of the main picture from an encoded main picture signal; (b) decoding the encoded main picture signal; and (c) signal-processing an input sub-picture signal and the main picture signal obtained in the step (b) based upon the main picture state detected in the step (a), to display sub-picture and the main picture so as to discern the sub-picture from the main picture.

There is also provided a picture display apparatus for displaying a sub-picture together with a main picture. The picture display apparatus comprises a detector for detecting a state of the main picture from an encoded main picture signal; a signal processor for decoding the encoded main picture, and signal-processing and outputting an input sub-picture signal and the main picture signal, in order to display main picture together with sub-picture; and a controller for controlling the operation of the signal processor based upon the main picture state detected in the detector so that the sub-picture is distinguished from the main picture.

BRIEF DESCRIPTION OF THE DRAWINGS

The above object and other advantages of the present invention will become more apparent by describing in detail the structures and operations of the present invention with reference to the accompanying drawings, in which.

DESCRIPTION OF THE PREFERRED EMBODIMENT

A preferred embodiment of the present invention will be described in detail with reference to the accompanying drawings.

Figure 1:
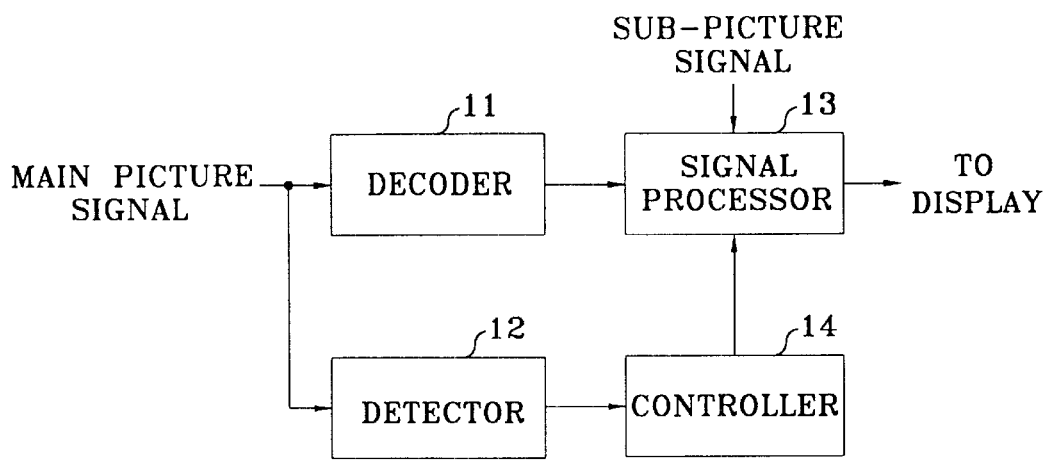
FIG. 1 is a block diagram showing a sub-picture display apparatus according to a preferred embodiment of the present invention.

Referring to FIG. 1, a sub-picture display apparatus according to an embodiment of the present invention uses, as a main picture to be displayed, a picture signal encoded according to moving picture compression standards, such as the MPEG standard. An encoded main picture signal is input to a decoder 11 and a detector 12. The decoder 11 decodes the input encoded main picture signal, and supplies the main picture signal to a signal processor 13.

The detector 12 uses the encoded main picture signal corresponding to each field-picture or each frame-picture to detect a spatial complexity or a degree of temporal movement as state information with respect to each main picture. Among the scanning methods according to the MPEG II standard, there are a zigzag scanning method, and an alternative scanning method used for a spatially complicated picture. In this embodiment, blocks scanned according to the alternative scanning method are used for detection of a spatial complexity. The detector 12 detects whether or not transform coefficients of each block are scanned according to the alternative scanning method. Then, the detector 12 detects the number of the alternative scanned blocks which are scanned according to the alternative scanning method, and supplies the number of the detected alternative scanned blocks to a controller 14 as a spatial complexity.

When a temporal movement degree is detected, the detector 12 uses motion vectors corresponding to macroblocks belonging to each main picture. The detector 12 detects motion vectors corresponding to each main picture, and sums or averages the detected motion vectors to obtain a global motion vector corresponding to the main picture. The detector 12 supplies the obtained global motion vector to the controller 14 as a temporal movement degree.

Figure 2:
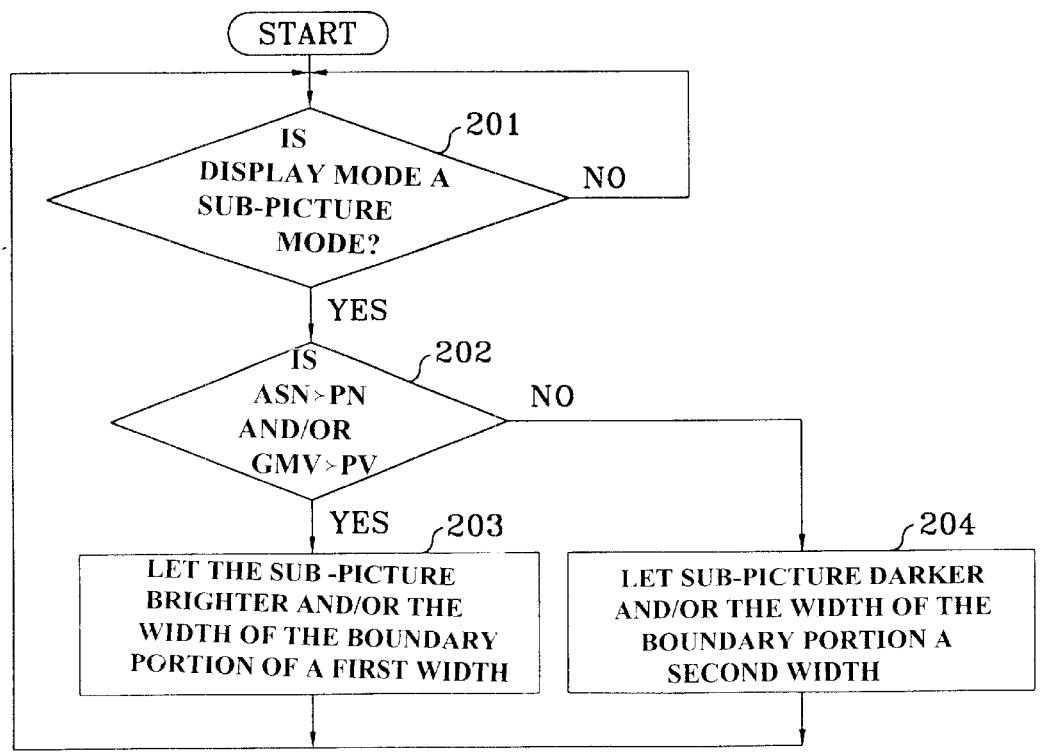
FIG. 2 is a flowchart diagram for explaining the operation of the controller shown in FIG. 1.
Figure 3:
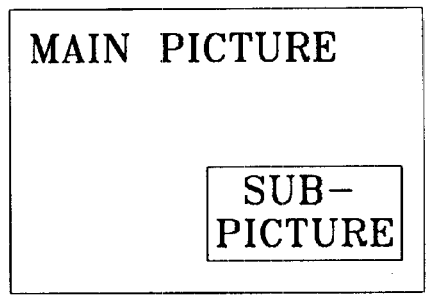
FIG. 3 is a conceptual view showing a general sub-picture display state.

FIG. 2 is a flowchart diagram for explaining the operation of the controller 14 shown in FIG. 1. In step 201, the controller 14 determines whether a current display mode is a sub-picture mode. When the current mode is a sub-picture mode, the controller 14 compares a spatial complexity or a temporal movement degree supplied from the detector 12 with a corresponding predetermined reference value (step 202). When the number of alternative scanned blocks, ASN, representing a spatial complexity is greater than a predetermined number (spatial complexity threshold) PN or a global motion vector, GMV, representing a temporal movement degree is greater than a predetermined vector (temporal movement degree threshold) PV, the controller 14 performs the process of step 203. On the contrary, when the ASN is smaller than or equal to the PN or the GMV is smaller than or equal to the PV, the controller 14 performs the process of step 204.

In step 203, the controller 14 controls a signal processor 13 so that a brightness of a sub-picture becomes brighter by a predetermined value, if the number ASN of the alternative scanned blocks is greater than a predetermined number PN. Also, if the GMV is greater than the PV, the controller 14 controls the signal processor 13 so that a width of a boundary portion between the main picture and the sub-picture becomes a predetermined first width which can be discerned between the main picture and the sub-picture.

Meanwhile, in step 204, the controller 14 controls the signal processor 13 so that a brightness of the sub-picture becomes darker by the predetermined value in the case that the number ASN of the alternative scanned blocks is smaller than or equal to the predetermined number PN. If the GMV is smaller than or equal to the PV, the controller 14 controls the signal processor 13 so that a width of a boundary portion between the main picture and the sub-picture becomes a predetermined second width which can be discerned between the main picture and the sub-picture. Here, the second width is narrower than the first width and has a value sufficient for discerning the sub-picture from the main picture.

The signal processor 13 receives the main picture signal from the decoder 11 and an external sub-picture signal and processes the main picture signal and the sub-picture signal under the control of the controller 14 so that the sub-picture is discerned from the main picture. The signal processor 13 outputs a display picture signal obtained by processing the main picture signal and the sub-picture signal.

Figure 4A:
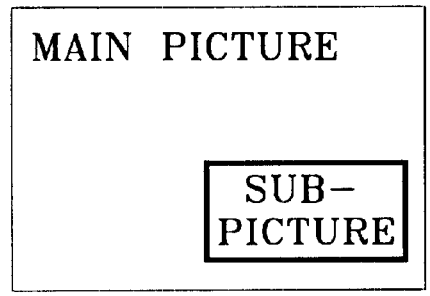
FIGS. 4A and 4B are views for explaining that the FIG. 1 apparatus displays the sub-picture and the main picture so that the sub-picture is discerned from the main picture.
Figure 4B:
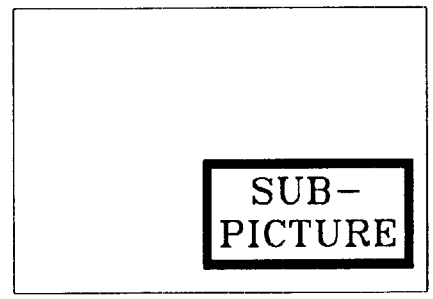

FIG. 4A shows a sub-picture whose brightness becomes darker than a current brightness of the sub-picture by a predetermined brightness, and in which a width of a boundary portion between the main picture and the sub-picture has a predetermined thickness, according to step 204 of FIG. 2. FIG. 4B shows a sub-picture whose brightness becomes brighter than a current brightness of the sub-picture by a predetermined brightness, and in which a width of a boundary portion between the main picture and the sub-picture has a predetermined thickness which is relatively thicker than that of FIG. 4A, according to step 203 of FIG. 2.

In the above embodiment, both the spatial complexity and the temporal movement degree of the main picture have been used for discerning the sub-picture and the main picture. However, only one of the spatial complexity and the temporal movement degree of the main picture can be used for discerning the sub-picture from the main picture.

As described above, the sub-picture display apparatus according to the present invention provides an effect capable of distinctively displaying the sub-picture more definitely and clearly, by thickening the boundary portion of the sub-picture and varying the brightness of the sub-picture to become brighter, in the case that the main picture is complicated spatially or an amount of temporal movement of the main picture is large.

What is claimed is:

1. A picture display method of displaying a sub-picture together with a main picture, the picture display method comprising steps of:

detecting, from an encoded main picture signal, a state of a main picture and outputting state information indicative of the detected state of the main picture, wherein the state information represents at least one of a spatial complexity of the main picture and a temporal movement degree of the main picture as detected from the encoded main picture signal;

decoding the encoded main picture signal; and signal-processing an input sub-picture signal and the decoded main picture signal based upon said state information, to display a sub-picture and the main picture so as to discern the sub-picture from the main picture.

2. The picture display method according to claim 1, wherein said step of detecting a state of a main picture comprises sub-steps of:

detecting blocks scanned according to an alternative scanning method from the encoded main picture signal of the main picture; and determining the spatial complexity of said main picture based upon a number of said blocks detected.

3. The picture display method according to claim 1, wherein said step of detecting a state of a main picture comprises sub-steps of:

detecting motion vectors corresponding to macroblocks from the encoded main picture signal of the main picture; and determining the temporal movement degree of said main picture based upon a number of the motion vectors detected.

4. The picture display method according to claim 3, wherein said step of determining the temporal movement degree of said main picture comprises a step of obtaining an average of the detected motion vectors in order to determine the temporal movement degree.

5. The picture display method according to claim 1, wherein said signal-processing step comprises sub-steps of:

increasing a current brightness of the sub-picture by a predetermined value, when at least one of the spatial complexity and the temporal movement degree is greater than a corresponding one of a predetermined spatial complexity threshold and a predetermined temporal movement degree threshold; and decreasing the current brightness of the sub-picture by a predetermined value, when at least one of the spatial complexity and the temporal movement degree is smaller than or equal to a corresponding one of said predetermined spatial complexity threshold and said predetermined temporal movement degree threshold.

6. The picture display method according to claim 1, wherein said signal-processing step comprises sub-steps of:

changing a width of a boundary between the main picture and the sub-picture to a first width, when at least one of the spatial complexity and the temporal movement degree is greater than a corresponding one of a predetermined spatial complexity threshold and a predetermined temporal movement degree threshold; and changing the width of the boundary portion to a second width narrower than the first width, when at least one of the spatial complexity and the temporal movement degree is smaller than or equal to a corresponding one of the predetermined spatial complexity threshold and the predetermined temporal movement degree threshold, wherein the first and second width of the boundary portion discern the sub-picture from the main picture.

7. The picture display method according to claim 1, wherein said signal-processing step comprises sub-steps of:

increasing a current brightness of the sub-picture by a predetermined value while simultaneously changing a width of a boundary portion between the main picture and the sub-picture to a first width, when at least one of the spatial complexity and the temporal movement degree is greater than a corresponding one of a predetermined spatial complexity threshold and a predetermined temporal movement degree threshold; and decreasing the current brightness of the sub-picture by a predetermined value while simultaneously changing the width of the boundary portion to a second width narrower than the first width, when at least one of the spatial complexity and the temporal movement degree is smaller than or equal to a corresponding one of the predetermined spatial complexity threshold and the predetermined temporal movement degree threshold, wherein the first and second width of the boundary portion discern the sub-picture from the main picture.

8. The picture display method according to claim 1, wherein said signal-processing step comprises a step of controlling at least one of a brightness of the sub-picture with respect to a brightness of the main picture and a width of a boundary portion between the main picture and the sub-picture.

9. A picture display apparatus for displaying a sub-picture together with a main picture, the picture display apparatus comprising:

a detector for detecting, from an encoded main picture signal, a state of the main picture and outputting state information indicative of the detected state of the main picture, wherein said state information represents at least one of a spatial complexity and a temporal movement degree of the main picture detected from the encoded main picture signal;

a decoder for decoding the encoded main picture signal and outputting a decoded main picture signal;

a signal processor for receiving a sub-picture signal and the decoded main picture signal and for outputting a display signal for displaying the sub-picture within a boundary area of said main picture; and a controller for controlling the operation of the signal processor based upon the state information output from the detector so that the sub-picture is discerned from the main picture.

10. The picture display apparatus according to claim 9, wherein said detector detects blocks scanned according to an alternative scanning method from the encoded main picture signal of each main picture, and determines the spatial complexity of said each main picture based upon a number of the detected blocks.

11. The picture display apparatus according to claim 9, wherein said detector detects motion vectors corresponding to macroblocks of said main picture signal of each main picture, and determines the temporal movement degree of said main picture based upon a number of detected motion vectors.

12. The picture display apparatus according to claim 11, wherein said detector uses a sum of the detected motion vectors in order to determine the temporal movement degree.

13. The picture display apparatus according to claim 9, wherein said controller compares at least one of the spatial complexity and the temporal movement degree with a corresponding one of a predetermined spatial complexity threshold and a predetermined movement degree threshold, and controls the operation of said signal processor so that a brightness of the sub-picture is altered according to the comparison result.

14. The picture display apparatus according to claim 13, wherein said signal processor increases the brightness of the sub-picture by a first predetermined value, when at least one of the spatial complexity and the temporal movement degree is greater than the corresponding one of the predetermined spatial complexity threshold and a predetermined temporal movement degree threshold, and reduces the brightness of the sub-picture by a second predetermined value, when at least one of the spatial complexity and the temporal movement degree is smaller than or equal to the corresponding one of said predetermined spatial complexity threshold and said predetermined temporal movement degree threshold.

15. The picture display apparatus according to claim 9, wherein said controller compares at least one of the spatial complexity and the temporal movement degree with a corresponding one of a predetermined spatial complexity threshold and a predetermined movement degree threshold, and controls the operation of said signal processor so that a width of the boundary portion between the main picture and the sub-picture is altered according to the comparison result.

16. The picture display apparatus according to claim 15, wherein said signal processor controls the width of the boundary portion between the main picture and the sub-picture to be at a first width, when at least one of the spatial complexity and the temporal movement degree is greater than the corresponding one of said predetermined spatial complexity threshold and said predetermined temporal movement degree threshold, and controls the width of the boundary portion to be at a second width narrower than the first width, when at least one of the spatial complexity and the temporal movement degree is smaller than or equal to the corresponding one of said predetermined spatial complexity threshold and said predetermined temporal movement degree threshold.

17. The picture display apparatus according to claim 9, wherein said controller compares at least one of the spatial complexity and the temporal movement degree with a corresponding one of a predetermined spatial complexity threshold and a predetermined movement degree threshold, and controls the operation of said signal processor so that both a brightness of the sub-picture and a width of the boundary portion between the main picture and the sub-picture are altered according to the comparison result.

18. The picture display apparatus according to claim 17, wherein said signal processor increases the brightness of the sub-picture by a first predetermined value while simultaneously changing a width of the boundary portion between the main picture and the sub-picture to a first width, when at least one of the spatial complexity and the temporal movement degree is greater than the corresponding one of said predetermined spatial complexity threshold and said predetermined temporal movement degree threshold, and reduces the brightness of the sub-picture by a second predetermined value while simultaneously changing the width of the boundary portion to a second width narrower than the first width, when at least one of the spatial complexity and the temporal movement degree is smaller than or equal to the corresponding one of said predetermined spatial complexity threshold and said predetermined temporal movement degree threshold.

* * * * *